US012643398B2

(12) United States Patent
Ga et al.

(10) Patent No.: US 12,643,398 B2
(45) Date of Patent: Jun. 2, 2026

(54) CUSTOM DRIFT CONTROL METHOD AND CUSTOM DRIFT CONTROL DEVICE

(71) Applicants: HYUNDAI MOTOR COMPANY, Seoul (KR); KIA CORPORATION, Seoul (KR)

(72) Inventors: Han Seon Ga, Seoul (KR); Jin Seok Song, Bucheon-si (KR); Sang Wook Han, Seoul (KR); So Ra Jang, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 71 days.

(21) Appl. No.: 18/753,710

(22) Filed: Jun. 25, 2024

(65) Prior Publication Data

US 2025/0236173 A1 Jul. 24, 2025

(30) Foreign Application Priority Data

Jan. 22, 2024 (KR) ........................ 10-2024-0009248

(51) Int. Cl.
B60K 23/08 (2006.01)

(52) U.S. Cl.
CPC .. B60K 23/0808 (2013.01); *B60K 2023/0816* (2013.01)

(58) Field of Classification Search
CPC ........ B60K 2023/0816; B60K 23/0808; B60L 15/20; B60W 10/08; B60W 2540/106; B60W 2540/215; B60W 2710/085; B60W 2720/26; B60W 2720/403; B60W 30/02; B60W 30/045; B60W 30/18009; B60W 30/18145; B60W 30/182; B60W 50/082; B60W 50/085; B60W 50/087
See application file for complete search history.

(56) References Cited

U.S. PATENT DOCUMENTS

| | | | |
|---|---|---|---|
| 2019/0337385 A1 | 11/2019 | Lim et al. | |
| 2023/0022906 A1* | 1/2023 | Balachandran | ....... B60W 10/20 |
| 2023/0166741 A1 | 6/2023 | Ga et al. | |
| 2023/0182567 A1 | 6/2023 | Song | |

FOREIGN PATENT DOCUMENTS

| | | |
|---|---|---|
| CN | 117400943 A | 1/2024 |
| DE | 10 2004 020 110 A1 | 11/2005 |
| DE | 10 2022 003 544 A1 | 12/2023 |
| KR | 10-2019-0127433 A | 11/2019 |
| KR | 10-2023-0081919 A | 6/2023 |

OTHER PUBLICATIONS

Extended European Search Report dated Jun. 2, 2025 issued in the corresponding European Patent Application No. 24217768.1.

* cited by examiner

*Primary Examiner* — Wade Miles
*Assistant Examiner* — Zachary Joseph Wallace
(74) *Attorney, Agent, or Firm* — Morgan, Lewis & Bockius LLP

(57) ABSTRACT

A custom drift control method includes: determining whether to enter a drift mode based on a drift mode activation condition; when the drift mode activation condition is satisfied, entering the drift mode; based on the entering the drift mode, receiving input information including at least one of an accelerator reaction speed level, an attitude control assist level, and road surface information from a user; and based on the input information, performing custom drift control.

18 Claims, 7 Drawing Sheets

CUSTOM DRIFT CONTROL METHOD AND CUSTOM DRIFT CONTROL DEVICE

CROSS-REFERENCE TO RELATED APPLICATION(S)

The present application claims priority to Korean Patent Application No. 10-2024-0009248 filed on Jan. 22, 2024, the entire contents of which is incorporated herein for all purposes by this reference.

BACKGROUND OF THE PRESENT DISCLOSURE

Field of the Present Disclosure

The present disclosure relates to a custom drift control method for perform differential drift control according to a user input and a custom drift control device.

Description of Related Art

Recently, with an increase in the number of high-powered vehicles, beyond simple functional aspects, control factors that take into account drivers' enjoyment of driving are increasing. One of the control factors is drifting using the characteristics of a rear-wheel-based vehicle.

Drifting is a technique in which to maintain high exit speed from a corner, a vehicle driver intentionally allows the rear wheels of a vehicle to lose traction while maintaining control of the vehicle, causing oversteering, to pass through a corner. In an electric vehicle, the above-described drifting may be achieved by distributing torque only to a rear wheel motor.

Due to the driving characteristics of a rear-wheel drive vehicle, rear tires may become saturated quickly, which may easily lead to oversteer in a vehicle. In the instant case, controlling the oversteer may lead to drifting.

Conventionally, there was no technology for performing drift control in consideration of driving skill or drifting skill of the driver. Accordingly, experienced drivers sometimes felt that drift control was not as sufficient as desired or that the control was intrusive, which was not desired, and beginner drivers sometimes found it difficult to control the vehicle during drift control.

To improve this, there is a need for technology that receives input from the driver and differentially is configured to perform drift control to the degree desired by the driver.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing differentially performing drift control according to a degree of selection by a driver.

The problem to be solved by the present disclosure is not limited thereto, and those of ordinary skill in the art will understand that other technical problems not mentioned herein may be derived from the configurations used in the following specification and drawings.

To achieve the above-described object, the present disclosure provides the following custom drift control method and custom drift control device.

According to an aspect of the present disclosure, a custom drift control method includes: determining whether to enter a drift mode based on a drift mode activation condition; when the drift mode activation condition is satisfied, entering the drift mode; based on the entering the drift mode, receiving input information including at least one of an accelerator reaction speed level, an attitude control assist level, and road surface information from a user; and based on the input information, performing custom drift control.

According to another aspect of the present disclosure, a custom drift control device includes: a processor; and a storage medium on which instructions for executing one or more programs configured to be executable by the processor are recorded, wherein the one or more programs include: determining whether to enter a drift mode based on a drift mode activation condition; when the drift mode activation condition is satisfied, entering the drift mode; based on the entering the drift mode, receiving input information including at least one of an accelerator reaction speed level, an attitude control assist level, and road surface information from a user; and based on the input information, performing custom drift control.

According to an exemplary embodiment of the present disclosure, drift control may be differentially performed according to the degree of user selection, and thus, the degree of drift control may be performed differently according to the driver's skill level or the degree of slippage on a road surface, increasing driving satisfaction of the driver.

The effects of the present disclosure are not limited to the above-described effects, and those of ordinary skill in the art will understand that other effects not mentioned herein may be derived from configurations used in the following specification and drawings.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
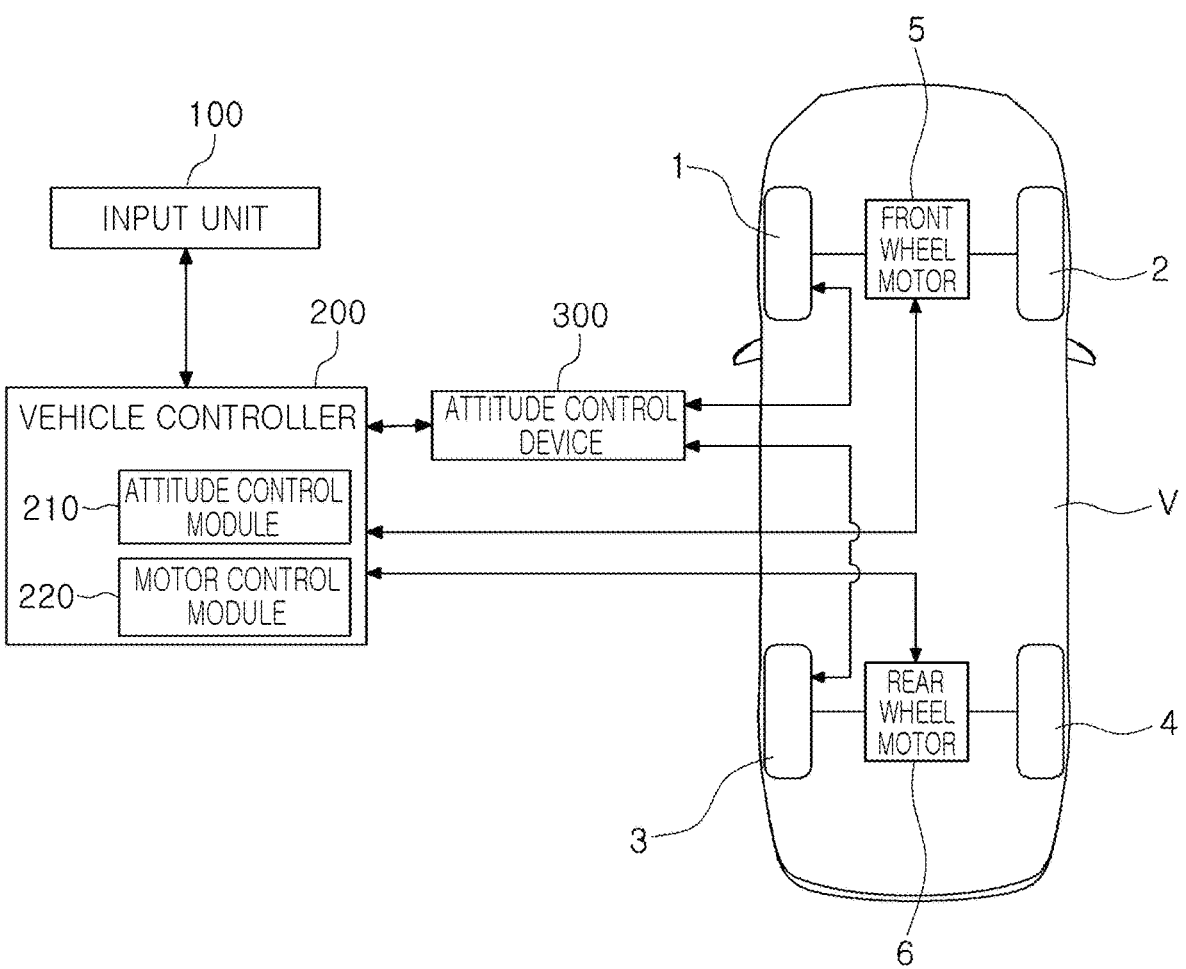
FIG. 1 illustrates a custom drift control device according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, preferred example embodiments will be described in detail with reference to the accompanying drawings so that those of ordinary skill in the art may easily implement the present disclosure. However, in describing preferred example embodiments of the present disclosure in detail, when it is determined that a detailed description of related known functions or configurations may unnecessarily obscure the gist of the present disclosure, the detailed description thereof will be omitted. Furthermore, the same reference numbers are used throughout the drawings to refer to the same or similar functions and actions.

Furthermore, throughout the specification, the terms "connected to" or "coupled to" are used to designate a connection or coupling of one element to another element and include both a case where an element is "directly connected or coupled to" another element and a case where an element is "indirectly connected or coupled to" another element via yet another element. Furthermore, when a certain portion "includes" or "comprises" a certain component, this indicates that other components are not excluded and may be further included unless otherwise noted.

The present disclosure may be implemented in many different forms and is not limited to the example embodiments described herein.

FIG. 1 illustrates a custom drift control device according to an exemplary embodiment of the present disclosure.

Referring to FIG. 1, a customer drift control device according to an exemplary embodiment of the present disclosure may include an input unit 100, a vehicle controller 200, and an attitude control device 300, and the vehicle controller 200 may include an attitude control module 210 and a motor control module 220.

The input unit 100 is an input device that allows the driver to select, and may be implemented, for example, with devices such as Audio, Video and Navigation (AVN) or paddle shift, or a mobile phone with a dedicated application provided.

Meanwhile, the input unit 100 may receive input information on an accelerator reaction speed level, an attitude control assist level, and road surface information from the user.

In the instant case, the accelerator reaction speed level may denote a change in a control amount according to a degree to which an accelerator pedal is pressed. For example, when an experienced driver desires an immediate output depending on an accelerator, the experienced driver may select an accelerator response speed level to be high. Alternatively, when a low-skilled driver desires a slow output according to the accelerator, the low-skilled driver may select the accelerator response speed level to be low. In the instant case, the accelerator reaction speed level may be provided to be selectable according to a set grade from low to high.

The attitude control assist level is information that enables selection of a degree of intervention in attitude control by an attitude control device 300.

The attitude control device 300 is a device preventing a driving vehicle from slipping and assisting to ensure stable driving. In general, a vehicle attitude control device is a device controlling a braking system and an engine in a dangerous driving situation in which a tire contact limit is reached during turning of the vehicle, and allowing the driver to turn in a desired trajectory. For example, when the vehicle skids on slippery road surface (due to rain, snow, etc.), contrary to the driver's intention to drive by manipulating a steering wheel, the vehicle moves in an unpredictable direction, which may cause a major problem for driver safety. In such situations, the vehicle attitude control device may automatically drive an attitude control function to ensure stable steering of the vehicle.

The attitude control device 300 may include a processor, sensors to measure vehicle orientation, actuators to apply the torques needed to orient the vehicle to a desired trajectory, and algorithms to command the actuators by the processor based on sensor measurements.

However, as a driver is more experienced, intervention with other control functions is less preferable, and the driver's willingness to drive the vehicle may be strong under active control. Accordingly, an experienced driver may receive less intervention from the stability control device by selecting a stability control assist level to be lower than the predetermined level, and a beginner driver may receive a large amount of assistance from the stability control device by selecting the stability control assist level to be high.

The road surface information may include information on a degree of slippage of the road surface. For example, when it is snowing or icy, the driver may select that the road surface is significantly slippery, or in the case of a dry road, the driver may select that the road surface is less slippery.

In another example embodiment, the driver may select a preset driver level. For example, when Beginner is selected, the accelerator reaction speed may be set to be low and the attitude control assist level may be set to be high. Furthermore, when Intermediate is selected, the accelerator reaction speed and attitude control assist degree may be set to be medium. Furthermore, when Advanced is selected, the accelerator reaction speed level may be set to high and the attitude control assist level may be set to low.

Figure 2:
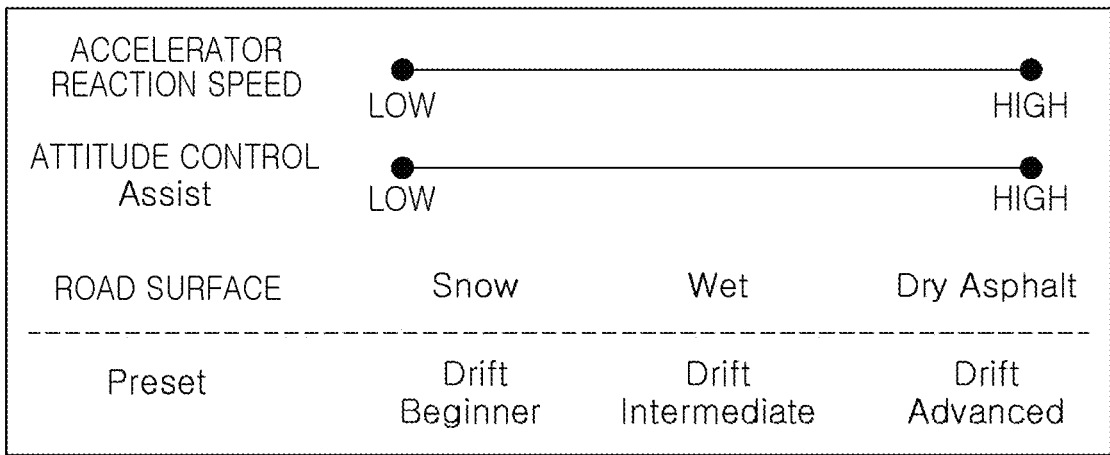
FIG. 2 is a view exemplarily illustrating an input screen of a user according to an exemplary embodiment of the present disclosure.

FIG. 2 is a diagram for explaining a user's input screen according to an exemplary embodiment of the present disclosure.

FIG. 2 is a view exemplarily illustrating an input screen of a user according to an exemplary embodiment of the present disclosure.

Referring to FIG. 2, an input screen of a user may be provided so that an accelerator reaction speed level and an attitude control assist level may be selected from low to high. Furthermore, the road surface may be provided with a choice of high slippery (Snow), medium slippery (Wet), or low slippery (Dry Asphalt) levels, and a preset level may also be selected.

Referring again to FIG. 1, the vehicle controller 200 configured to control the entire vehicle may include an attitude control module 210 and a motor control module 220.

The attitude control module 210 may transmit a control signal to the attitude control device 300 and may instruct the attitude control device 300 to perform attitude control. A braking control-related operation may be performed in the attitude control module 210, a result value may be transmitted to the attitude control device 300, and the attitude control device may drive an actuator, and the like, according to the received result value.

Additionally, the attitude control module 210 may differentially apply a control amount of control involved in the attitude control of the vehicle according to the attitude control assist level. As the driver is more experienced, intervention from other controllers is less preferable, and the driver may have strong willingness to control attitude of the vehicle solely through the driver input. Accordingly, as the attitude control assist level is lower, the intervention of the controllers may be delayed maximally.

In an exemplary embodiment of the present disclosure, each of the attitude control module 210 and the motor control module 220 may be implemented by a processor in a form of hardware or software, or in a combination of hardware and software. Alternatively, the attitude control module 210 and the motor control module 220 may be implemented as a single processor in a form of hardware or software, or in a combination of hardware and software.

As a method of differentiating a degree of attitude control, there may be a method of differentiating a control point and a method of differentiating a control amount.

A method of differentiating the control point may differentially set a control threshold for performing attitude control, and when the attitude control assist level is high, the control threshold may be set to be low so that immediate attitude control may be performed, and when the attitude control assist level is low, the control threshold may be set to be high so that attitude control may be performed as late as possible.

Meanwhile, a method of differentiating the control amount may differentially set the control amount according to attitude control according to the attitude control assist level, and when the attitude control assist level is high, the control amount according to attitude control may be set to be high, and when the attitude control assist level is low, other control amounts for attitude control may be set to be low.

Additionally, the motor control module 220 may transmit control signals to a front wheel motor 5 and a rear wheel motor 6 of vehicle V having front wheels 1 and 2 and rear wheels 3 and 4. A control method of the motor control module will be described below with reference to FIGS. 3, 4, 6 and 7.

Figure 3:
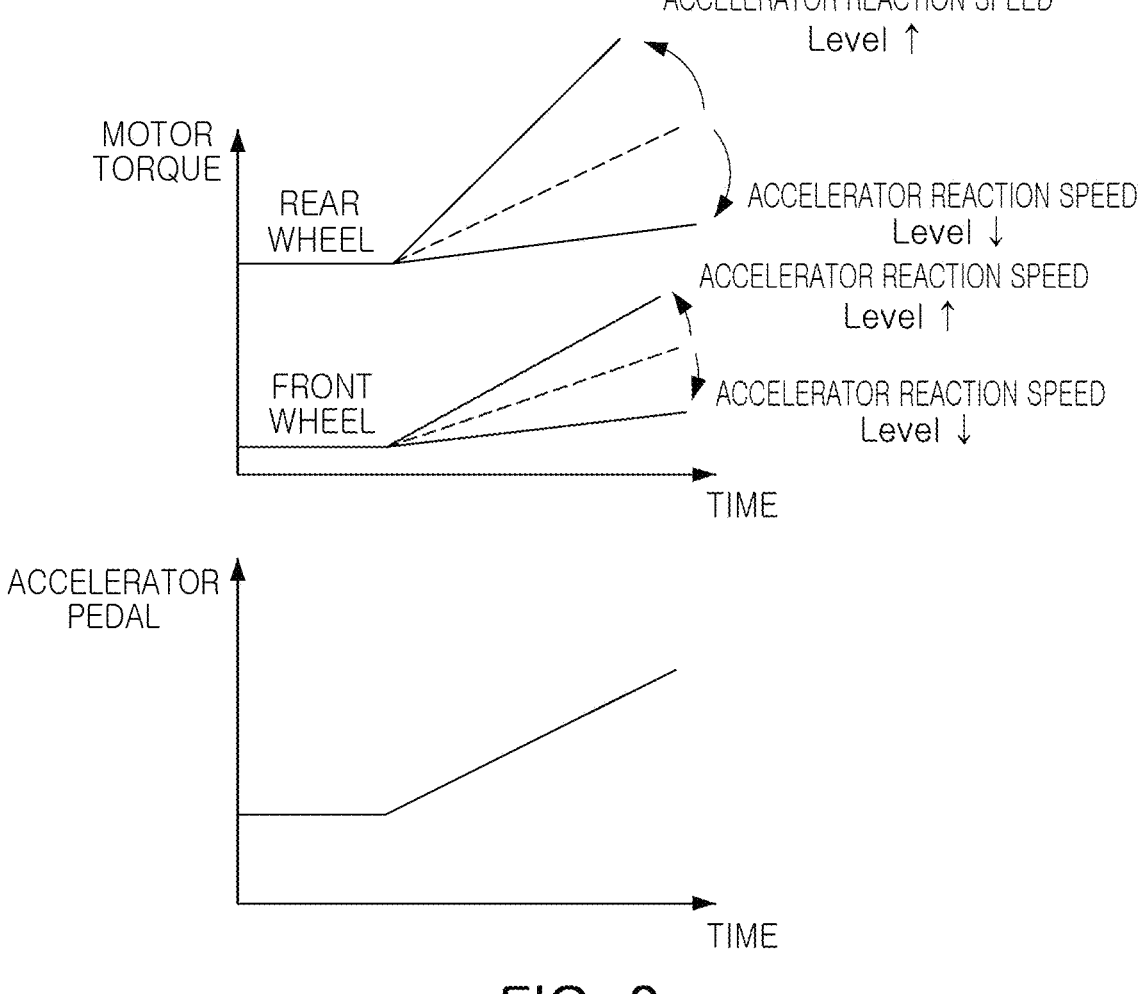
FIG. 3 and FIG. 4 are views exemplarily illustrating a method of controlling a slope of a motor torque according to a degree of pressing of an accelerator pedal by a vehicle controller according to an exemplary embodiment of the present disclosure.
Figure 4:
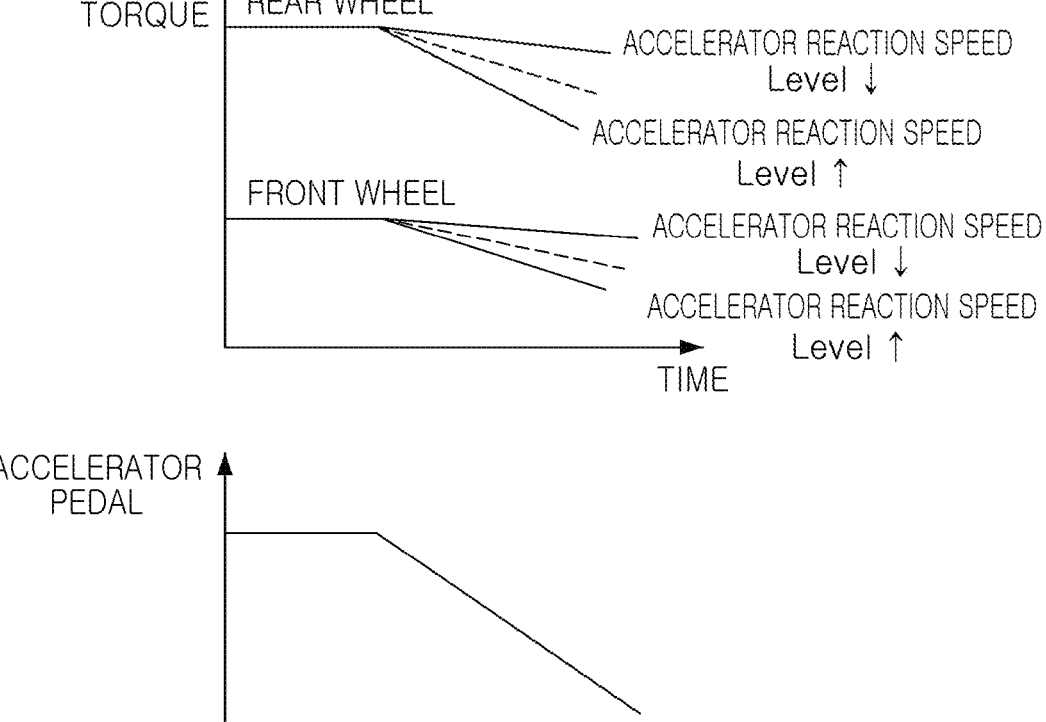

FIG. 3 and FIG. 4 are views exemplarily illustrating a method of controlling a slope of a motor torque according to a degree of pressing of an accelerator pedal by a vehicle controller according to an exemplary embodiment of the present disclosure.

Referring to FIG. 3 and FIG. 4, the following graph shows a degree to which an accelerator pedal is pressed over time, and the graph shows a motor torque of front and rear wheels according to the degree to which the accelerator pedal is pressed. In the graph, a dotted line represents a case of basic mode control.

When an accelerator reaction speed level is high, a slope of a front wheel motor torque and a slope of a rear wheel motor torque depending on the degree to which the accelerator pedal is pressed may be greater than basic mode control. Additionally, when the accelerator reaction speed level is low, the slope of the front wheel motor torque and the slope of the rear wheel motor torque depending on the degree to which the accelerator pedal is pressed may be smaller than the basic mode control.

Figure 5:
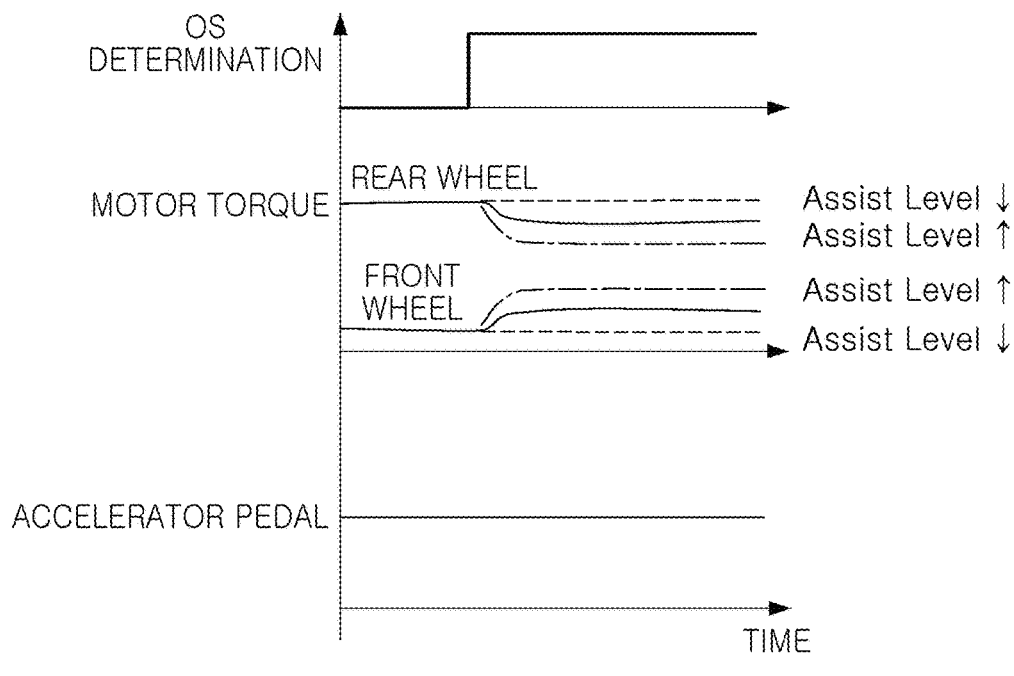
FIG. 5 is a view exemplarily illustrating a degree of intervention of a front wheel reinforcement control mode depending on an attitude control assist level by a vehicle controller according to an exemplary embodiment of the present disclosure.

FIG. 5 is a view exemplarily illustrating a degree of intervention of a front wheel reinforcement control mode depending on an attitude control assist level by a vehicle controller according to an exemplary embodiment of the present disclosure.

The front wheel reinforcement control mode is a type of attitude control method using a stability control module or a stability control device, and may be a control method which may perform attitude control through motor torque control of front wheels and rear wheels when rear tires saturate faster than front tires and a slip angle of the rear wheels becomes greater than a slip angle of the front wheels.

Referring to FIG. 5, even if there is no change in the degree to which the accelerator pedal is pressed, by operation of the attitude control device, a rear wheel motor torque may decrease and a front wheel motor torque may increase.

When the attitude control assist level is high, a degree of intervention of the front wheel reinforcement control mode may be increased to lower a rear wheel torque and to increase a front wheel torque, and thus, a more torque may be applied to the front wheels, which may help the driver to perform control attitude more easily.

On the other hand, when the attitude control assist level is low, the degree of intervention in the front wheel reinforcement control mode may be lowered, so that an effect of attitude control hardly occurs, and thus, the driver input may be maximally reflected, hold the attitude without the assistance of motor control.

Figure 6:
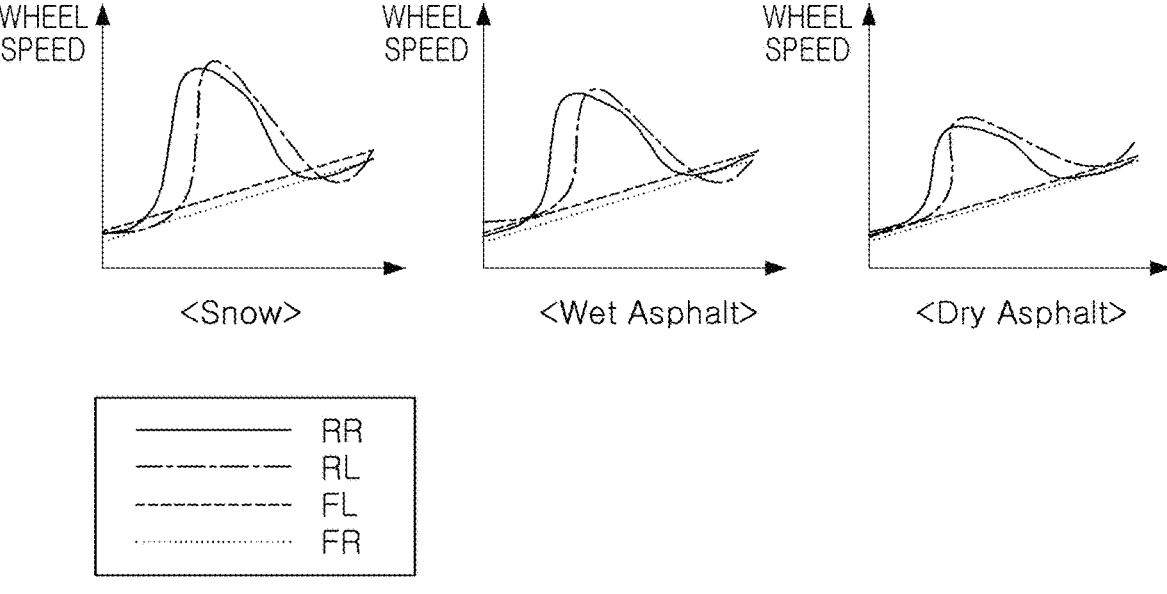
FIG. 6 illustrates wheel speed according to a road surface condition when differential control of a wheel slip is not applied.
Figure 7:
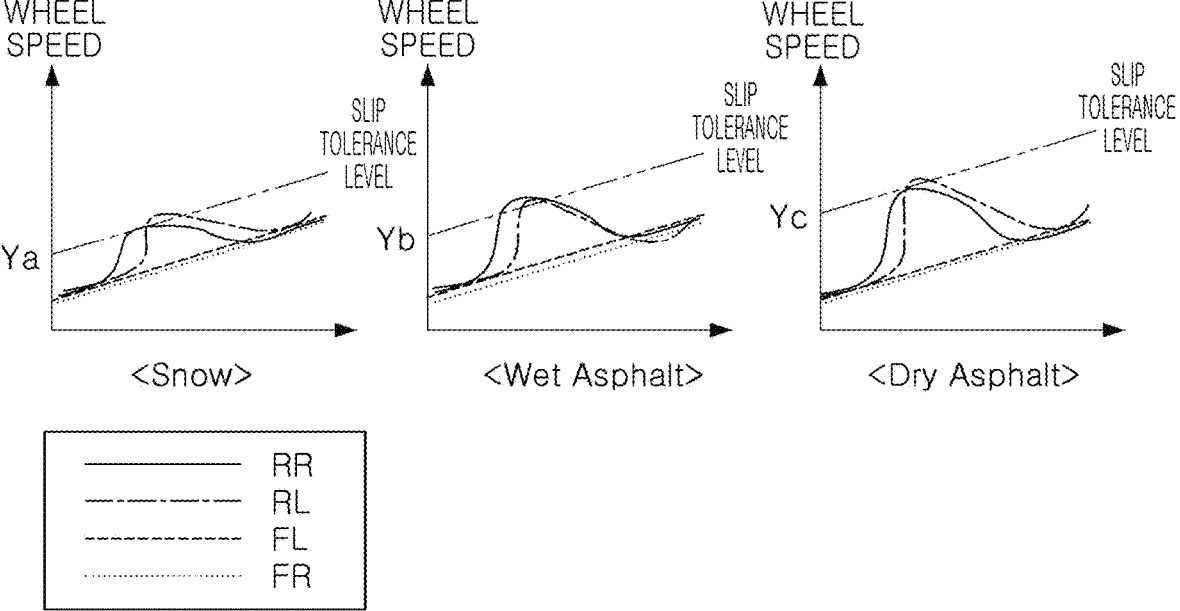
FIG. 7 illustrates wheel speed according to a road surface condition when the differential control according to an exemplary embodiment of the present disclosure is applied.

FIG. 6 illustrates wheel speed according to a road surface condition when differential control of a wheel slip is not applied, and FIG. 7 illustrates wheel speed according to a road surface condition when the differential control according to an exemplary embodiment of the present disclosure is applied.

In FIG. 6 and FIG. 7, wheel speed of the rear wheels may be indicated as RR and RL, and wheel speed of the front wheels may be indicated as FL and FR.

Even if the same motor torque is applied, a road surface friction coefficient may vary, depending on the type of road surface, so that a degree to which wheel slip occurs may be changed, and the amount of wheel slip may vary. Accordingly, road surface information may be input from the user, and wheel slip control may be performed according to the road surface information to facilitate a drift of the driver.

Referring to FIG. 6, in a leftmost graph, when a degree of slippage on the road surface is high (Snow), it may be confirmed that a large amount of wheel slip occurred at the rear wheel. Additionally, in a rightmost graph, when the degree of slippage of the road surface is low (Dry Asphalt), it may be confirmed that less wheel slip occurred. Even if the same torque is applied, wheel slip may occur easily in an order of the highest degree of slippage of the road surface. Accordingly, as the friction of the road surface is lower, slip may occur more easily so that it is easy to drift. Accordingly, after the slip occurs to a certain extent, there is no need to excessively increase a motor torque even if the accelerator is further applied, and when excessive wheel slip is maintained for a long time, the risk of hardware failure increases. Accordingly, in a case of the road surface having lower friction, a wheel slip tolerance level may be set to be tighter.

Referring to FIG. 7, when the road surface information is set to be significantly slippery (Snow), an occurrence of the wheel slip may be suppressed by setting the wheel slip tolerance level to be low. Additionally, when the road surface information is set to be less slippery (Dry Asphalt), a large degree of wheel slip may be tolerated by setting the wheel slip tolerance level to be high.

Figure 8:
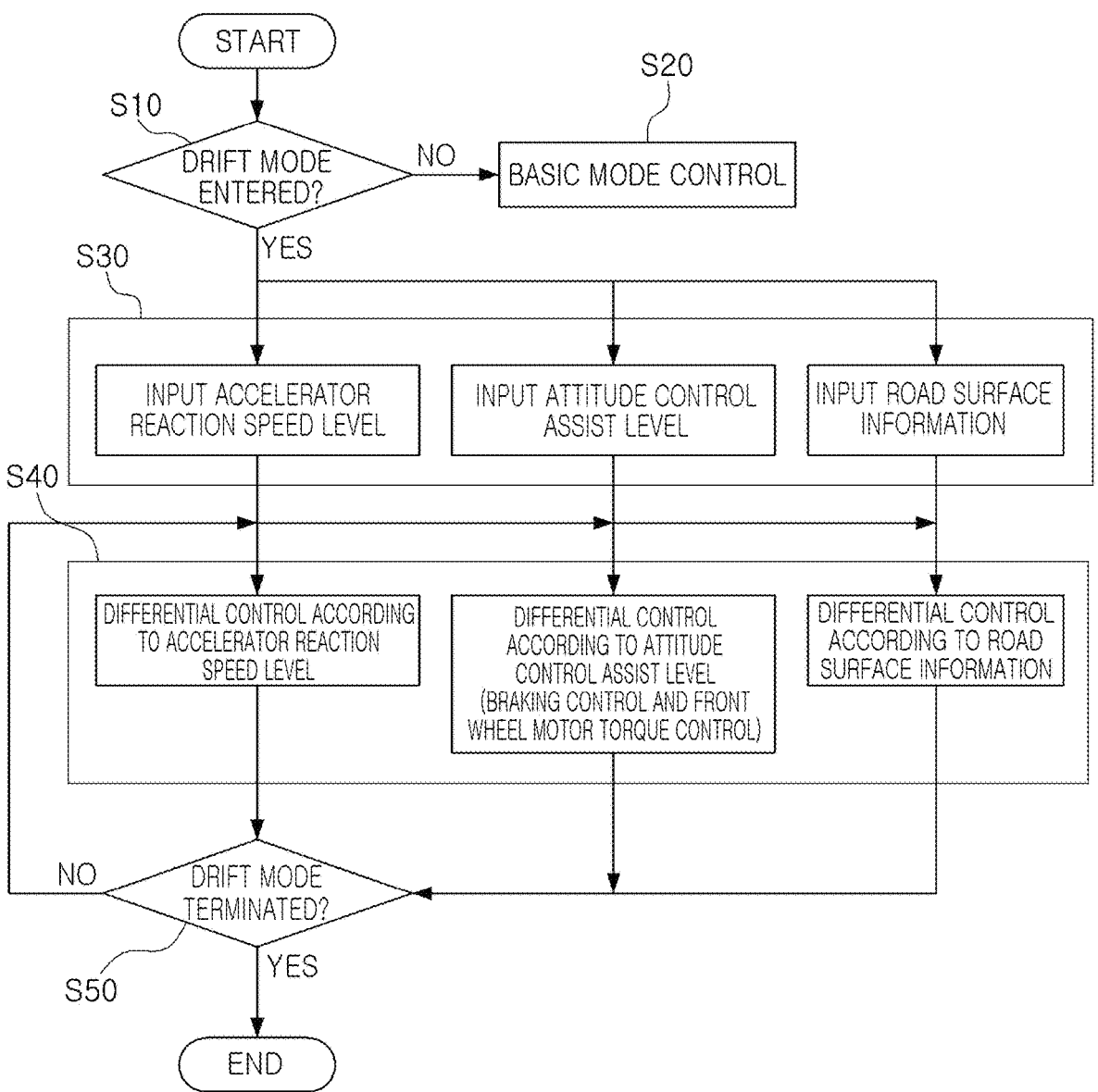
FIG. 8 is a flowchart illustrating a customer drift control method according to an exemplary embodiment of the present disclosure.

FIG. 8 is a flowchart illustrating a customer drift control method according to an exemplary embodiment of the present disclosure.

Referring to FIG. 8, in operation S10, it may be determined whether to enter a drift mode based on a drift mode activation condition. The drift mode activation condition may be set in advance, and when the activation condition is satisfied through user input or manipulation, the drift mode may be entered.

In operation S20, when the drift mode activation condition is not met, basic mode control may be performed.

In operation S30, when the drift mode activation condition is satisfied, the drift mode may be entered and input information may be received from the user. The input information may include at least one of an accelerator reaction speed level, an attitude control assist level, and road surface information.

Accordingly, in operation S40, customer drift control may be performed according to each of the accelerator reaction speed level, the attitude control assist level, and the road surface information.

Additionally, in operation S50, when a drift mode release condition is satisfied, the drift mode may be terminated, and when the drift mode release condition is not satisfied, the customer drift control may still be performed.

Figure 9:
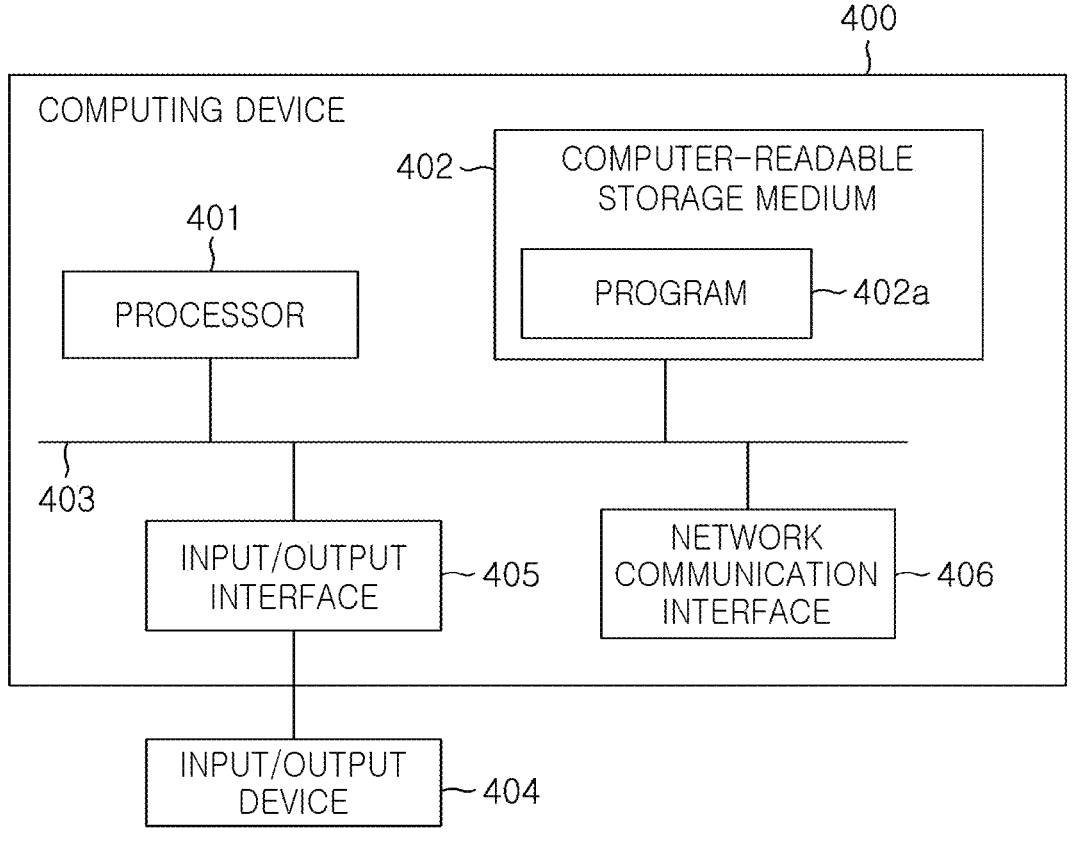
FIG. 9 may be a block diagram of a computing device configured to entirely or partially implement a customer drift control device according to an exemplary embodiment of the present disclosure.

Meanwhile, FIG. 9 may be a block diagram of a computing device 400 configured to entirely or partially implement a customer drift control device according to an exemplary embodiment of the present disclosure.

As illustrated in FIG. 9, the computing device 400 includes at least one processor 401, a computer-readable storage medium 402, and a communication bus 403.

The processor 401 may enable the computing device 400 to operate according to the example embodiments described above. For example, the processor 401 may execute one or more programs stored in the computer-readable storage medium 402. The one or more programs may include one or more computer executable instructions, and the computer-executable instructions, when executed by the processor 401, may be configured to cause the computing device 400 to perform operations according to example embodiments.

The computer-readable storage medium 402 is configured to store computer-executable instructions or program code, program data, and/or other suitable form of information. A program 402a stored in the computer-readable storage medium 402 includes a set of instructions executable by the processor 401. In an example embodiment, the computer-readable storage medium 402 may be a memory (a volatile memory, such as a random access memory, a non-volatile memory, or an appropriate combination thereof), one or more magnetic disk storage devices, optical disk storage devices, flash memory devices, another type of storage medium that may be accessed by the computing device 400 and may store desired information, or a suitable combination thereof.

A communication bus 403 interconnects various other components of the computing device 400, including processor 401 and the computer-readable storage medium 402.

The computing device 400 also includes one or more input/output interfaces 405 that provide an interface for one or more input/output devices 404, and one or more network communication interfaces 406. The input/output interface 405 and the network communication interface 406 are connected to the communication bus 403.

The input/output device 404 may be coupled to other components of the computing device 400 through an input/output interface 405. An exemplary input/output device 404 may include input devices such as a pointing device (such as a mouse or a trackpad), a keyboard, a touch input device (such as a touchpad or a touchscreen), voice or sound input devices, various types of sensor devices and/or an imaging device, and/or output devices such as a display device, a printer, a speaker, and/or a network card. The exemplary input/output device 404 may be included in the computing device 400 as a component of the computing device 400, and may be a separate device that is distinct from the computing device 400 and may be connected to the computing device 400.

Meanwhile, an exemplary embodiment of the present disclosure may include a program for performing the methods described herein on a computer, and a computer-readable recording medium including the program. The computer-readable recording medium may include program instructions, local data files, local data structures, and the like, alone or in combination. The media may be those specifically designed and constructed for the present disclosure, or may be those commonly available in the computer software field. Examples of the computer-readable recording media include magnetic media such as a hard disk, a floppy disk, and a magnetic tape, optical recording media such as CD-ROM and DVD, and hardware devices specifically configured to store and execute program instructions, such as ROM, RAM, a flash memory, and the like. Examples of the program may include not only a machine language code such as that generated by a compiler, but also a high-level language code that may be executed by a computer using an interpreter or the like.

Although representative example embodiments of the present disclosure have been described in detail above, those skilled in the art will understand that the above-described embodiments may be modified in various ways without departing from the scope of the present disclosure. Therefore, the scope of the present disclosure should not be limited to the described exemplary embodiment and should be determined by the claims described below as well as those equivalent to the claims.

Furthermore, in describing the present disclosure, 'unit' or 'module' may be implemented in various ways, such as a processor, program commands executed by the processor, a software module, a micro code, a computer program product, a logic circuit, an application-only integrated circuit, a firmware, etc.

The content of the method included in example embodiments of the present disclosure may be directly implemented by a hardware processor, or may be implemented and performed by a combination of hardware and software modules among the processors. Software modules may be stored in a random access memory, a flash memory, a read-only memory, a programmable read-only memory or an electrically erasable programmable memory, and a conventional non-transitory storage medium such as a register and the like. The non-transitory storage medium is disposed in a memory, and the processor reads information stored in the memory and combines the information with the hardware to complete the contents of the method described above. To prevent duplication, detailed descriptions are omitted here.

In various exemplary embodiments of the present disclosure, each operation described above may be performed by a control device, and the control device may be configured by multiple control devices, or an integrated single control device.

In various exemplary embodiments of the present disclosure, the memory and the processor may be provided as one chip, or provided as separate chips.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A custom drift control method, comprising:
determining, by a processor, whether to enter a drift mode based on a drift mode activation condition;
in response that the drift mode activation condition is satisfied, entering, by the processor, the drift mode;
based on the entering the drift mode, receiving, by the processor, input information including at least one of an accelerator reaction speed level, an attitude control assist level, and road surface information from a user; and
based on the input information, performing, by the processor, custom drift control,
wherein the performing the custom drift control includes:
based on the accelerator reaction speed level, differentially controlling a slope of a front wheel motor torque and a slope of a rear wheel motor torque according to a degree to which an accelerator pedal is pressed.

2. The custom drift control method of claim 1, wherein the differentially controlling the slope of the front wheel motor torque and the slope of the rear wheel motor torque includes:
in response that the accelerator reaction speed level is higher than a predetermined level, controlling the slope of the front wheel motor torque and the slope of the rear wheel motor torque according to the degree to which the accelerator pedal is pressed to be greater than basic mode control; and
in response that the accelerator reaction speed level is lower than the predetermined level, controlling the slope of the front wheel motor torque and the slope of the rear wheel motor torque according to the degree to which the accelerator pedal is pressed to be smaller than the basic mode control.

3. The custom drift control method of claim 1, wherein the performing the custom drift control includes:
based on the attitude control assist level, differentially setting a control threshold for performing attitude control.

4. The custom drift control method of claim 3, wherein the differentially setting the control threshold includes:
in response that the attitude control assist level is higher than a predetermined level, setting the control threshold to be lower than basic mode control; and
in response that the attitude control assist level is lower than the predetermined level, setting the control threshold to be higher than the basic mode control.

5. The custom drift control method of claim 1, wherein the performing the custom drift control includes:

based on the attitude control assist level, differentially setting a control amount according to attitude control.

6. The custom drift control method of claim 5, wherein the differentially setting the control amount include:

in response that the attitude control assist level is higher than a predetermined level, setting the control amount according to the attitude control to be higher than basic mode control; and in response that the attitude control assist level is lower than the predetermined level, setting the control amount according to the attitude control to be lower than the basic mode control.

7. The custom drift control method of claim 1, wherein the performing the custom drift control include:

based on the attitude control assist level, differentially setting a degree of intervention of a front wheel reinforcement control mode of lowering a rear wheel motor torque and increasing a front wheel motor torque.

8. The custom drift control method of claim 7, wherein the differentially setting the degree of intervention of the front wheel reinforcement control mode includes:

in response that the attitude control assist level is higher than a predetermined level, setting the rear wheel motor torque to be lower and the front wheel motor torque to be higher, by increasing the degree of intervention of the front wheel reinforcement control mode; and in response that the attitude control assist level is lower than the predetermined level, setting the rear wheel motor torque to be higher and the front wheel motor torque to be lower, by lowering the degree of intervention of the front wheel reinforcement control mode.

9. The custom drift control method of claim 1, further including:

in response that the drift mode activation condition is not satisfied, performing, by the processor, basic mode control.

10. A custom drift control apparatus, comprising:

a processor; and a storage medium on which instructions for executing one or more programs configured to be executable by the processor are recorded, wherein the processor is configured for, by executing the one or more programs:

determining whether to enter a drift mode based on a drift mode activation condition;

in response that the drift mode activation condition is satisfied, entering the drift mode;

based on the entering the drift mode, receiving input information including at least one of an accelerator reaction speed level, an attitude control assist level, and road surface information from a user; and based on the input information, performing custom drift control, wherein in the performing the custom drift control, the processor is further configured for:

based on the accelerator reaction speed level, differentially controlling a slope of a front wheel motor torque and a slope of a rear wheel motor torque according to a degree to which an accelerator pedal is pressed.

11. The custom drift control apparatus of claim 10, wherein in the differentially controlling the slope of the front wheel motor torque and the slope of the rear wheel motor torque, the processor is further configured for:

in response that the accelerator reaction speed level is higher than a predetermined level, controlling the slope of the front wheel motor torque and the slope of the rear wheel motor torque according to the degree to which the accelerator pedal is pressed to be greater than basic mode control; and in response that the accelerator reaction speed level is lower than the predetermined level, controlling the slope of the front wheel motor torque and the slope of the rear wheel motor torque according to the degree to which the accelerator pedal is pressed to be smaller than the basic mode control.

12. The custom drift control apparatus of claim 10, wherein in the performing the custom drift control, the processor is further configured for:

based on the attitude control assist level, differentially setting a control threshold for performing attitude control.

13. The custom drift control apparatus of claim 12, wherein in the differentially setting the control threshold, the processor is further configured for:

in response that the attitude control assist level is higher than a predetermined level, setting the control threshold to be lower than basic mode control; and in response that the attitude control assist level is lower than the predetermined level, setting the control threshold to be higher than the basic mode control.

14. The custom drift control apparatus of claim 10, wherein in the performing the custom drift control, the processor is further configured for:

based on the attitude control assist level, differentially setting a control amount according to attitude control.

15. The custom drift control method of claim 14, wherein in the differentially setting the control amount, the processor is further configured for:

in response that the attitude control assist level is higher than a predetermined level, setting the control amount according to the attitude control to be higher than basic mode control; and in response that the attitude control assist level is lower than the predetermined level, setting the control amount according to the attitude control to be lower than the basic mode control.

16. The custom drift control apparatus of claim 10, wherein in the performing the custom drift control, the processor is further configured for:

based on the attitude control assist level, differentially setting a degree of intervention of a front wheel reinforcement control mode of lowering a rear wheel motor torque and increasing a front wheel motor torque.

17. The custom drift control apparatus of claim 16, wherein in the differentially setting the degree of intervention of the front wheel reinforcement control mode, the processor is further configured for:

in response that the attitude control assist level is higher than a predetermined level, setting the rear wheel motor torque to be lower and the front wheel motor torque to be higher, by increasing the degree of intervention of the front wheel reinforcement control mode; and in response that the attitude control assist level is lower than the predetermined level, setting the rear wheel motor torque to be higher and the front wheel motor torque to be lower, by lowering the degree of intervention of the front wheel reinforcement control mode.

18. The custom drift control apparatus of claim 10, wherein the processor is further configured for:

in response that the drift mode activation condition is not satisfied, performing basic mode control.

* * * * *